(12) United States Patent
Hussaini et al.

(10) Patent No.: US 6,989,948 B2
(45) Date of Patent: Jan. 24, 2006

(54) COMPACT MAGNIFIER FOR MOUNTING TO A PORTABLE VIDEO DEVICE

(75) Inventors: Saied Hussaini, Miami, FL (US); Marc Iacovelli, Miami, FL (US)

(73) Assignee: Intec, Inc., Miami, FL (US)

( * ) Notice: Subject to any disclaimer, the term of this patent is extended or adjusted under 35 U.S.C. 154(b) by 0 days.

(21) Appl. No.: 10/681,336

(22) Filed: Oct. 9, 2003

(65) Prior Publication Data

US 2005/0078385 A1    Apr. 14, 2005

(51) Int. Cl.
*G02B 27/00* (2006.01)
*G02B 3/00* (2006.01)

(52) U.S. Cl. ............... 359/809; 359/810; 359/817; 359/815

(58) Field of Classification Search ............ 359/801–4, 359/809–11, 813, 815–19, 822–3, 827; 329/809

See application file for complete search history.

(56) References Cited

U.S. PATENT DOCUMENTS

| | | | | |
|---|---|---|---|---|
| 4,991,935 A * | 2/1991 | Sakurai | ....................... | 359/804 |
| 5,307,209 A * | 4/1994 | Iaquinto et al. | ............. | 359/811 |
| 5,325,278 A | 6/1994 | Tortola et al. | ............... | 362/109 |
| 6,099,130 A * | 8/2000 | Rockwell | ..................... | 353/120 |
| 6,417,894 B1 * | 7/2002 | Goff et al. | ................... | 348/832 |
| 6,614,604 B1 * | 9/2003 | Budde | ........................ | 359/817 |
| 6,795,256 B2 * | 9/2004 | Wang | .......................... | 359/803 |
| 2003/0089832 A1 * | 5/2003 | Gold | .......................... | 248/454 |

* cited by examiner

*Primary Examiner*—Jordan M. Schwartz
*Assistant Examiner*—Jessica Stultz
(74) *Attorney, Agent, or Firm*—Berenato, White & Stavish

(57) ABSTRACT

A magnifier device for magnifying a portable video image produced by a video display device. The magnifier includes a base member connected a magnifier portion connected to and rotatable relative to the base member. The magnifier portion is rotatable to facilitate rotation between a first position adjacent a display window of the video device to magnify a display and a stored position compactly arranged adjacent the video display device. The magnifier device can be securely affixed to the video display device and folded to a compact stored position while attached.

16 Claims, 8 Drawing Sheets

COMPACT MAGNIFIER FOR MOUNTING TO A PORTABLE VIDEO DEVICE

The present application claims the benefit of co-pending U.S. application Ser. No. 29/187,873 filed on Aug. 11, 2003 and Ser. No. 29/187,874 filed Aug. 11, 2003, both entitled "Magnifier" each of which is incorporated herein by referenced.

BACKGROUND OF THE INVENTION

1. Filed of the Invention

The present invention is directed to magnifier device and more particularly to a magnifier for a portable video display device.

2. Discussion of the Related Art

Hand held, portable, battery-operated video devices are well known in the art. Such devices include, but are not limited to: calculators; computer video games; lap top computers; and other computers, particularly a compact video game known as the Game Boy "SP". (a trademark of Nintendo of America, Inc.) The video display screens of such hand-held computers are often quite small and consequently difficult to view. It has been proposed to employ a magnifying device in an effort enhance the viewing of such small displays. One such device is disclosed in U.S. Pat. No. 5,325,278 which is incorporated herein by reference. However, such prior art devices are difficult and cumbersome to use, do not store compactly, and are not suited for use with a flip up display panel.

SUMMARY OF THE INVENTION

The present invention is directed to a compact magnifier device for magnifying a video image produced by a video display device. The magnifier includes a magnifier portion connected to and rotatable relative to a base member. The magnifier portion is rotatable to facilitate rotation between a first position adjacent a display window to magnify a display and a stored position compactly arranged adjacent the video display device. The magnifier device can be securely affixed to the video display device and folded to a compact stored position while attached.

DETAILED DESCRIPTION OF THE PREFERRED EMBODIMENTS

Figure 1:
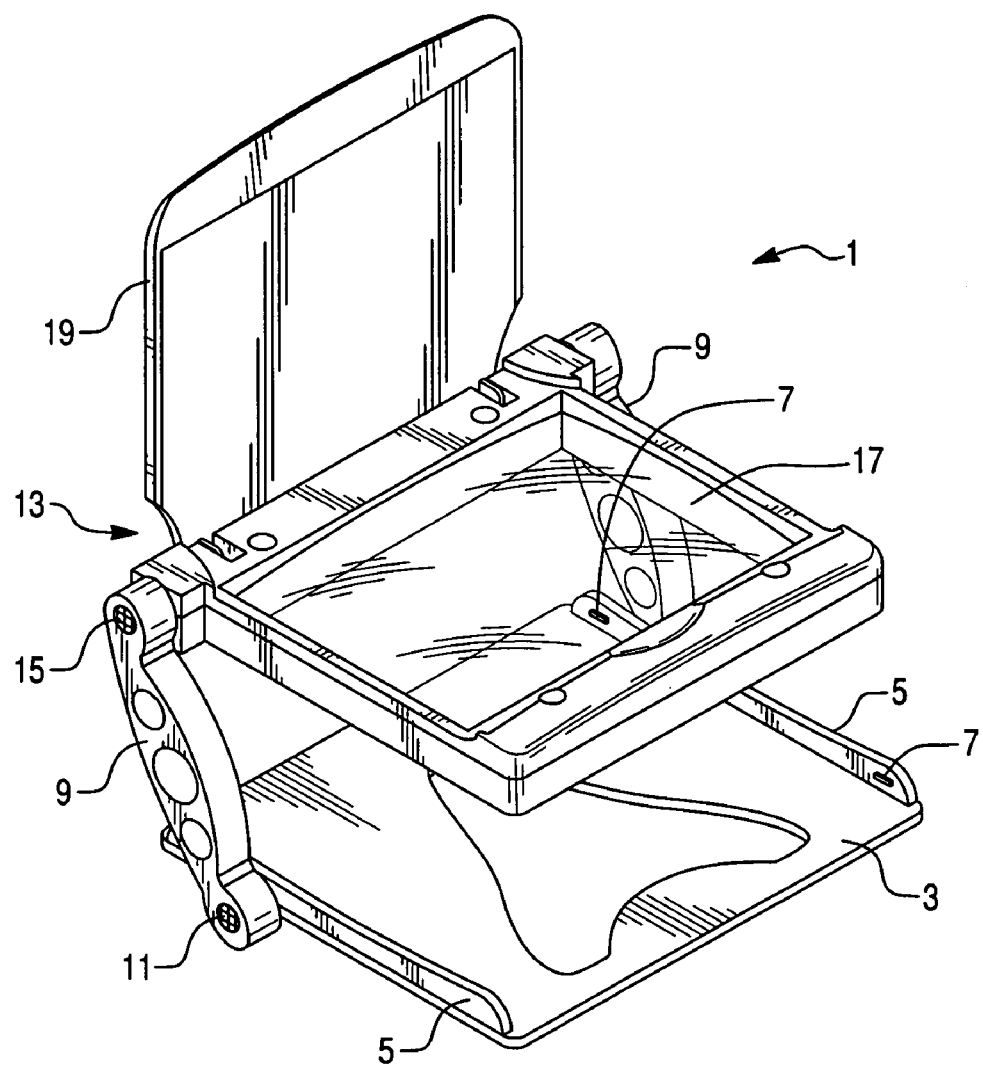
FIG. 1 a perspective view of the magnifier device according to the present invention.

FIG. 1 depicts a magnifier if a first embodiment according to the present invention. The magnifier 1 includes a rectangular planar base member 3 having a pair of opposing side rails 5. Each of the side rails 5 have a pair of detents 7 projecting inward for connection to a corresponding recess of a portion of the video display device. A pair of spaced apart linking arms 9 are pivotably connected to the base member about hinge 11. The linking arms 9 extend to a magnifier portion 13 and are pivotably secured thereto at hinge 15. The magnifier portion 13 includes a substantially rectangular planar portion have a magnifying lens 17 for magnifying an image thereunder. A cover 19 is rotatably secured to the magnifier portion 13 to selectively cover and expose the magnifying lens 17.

Figure 2:
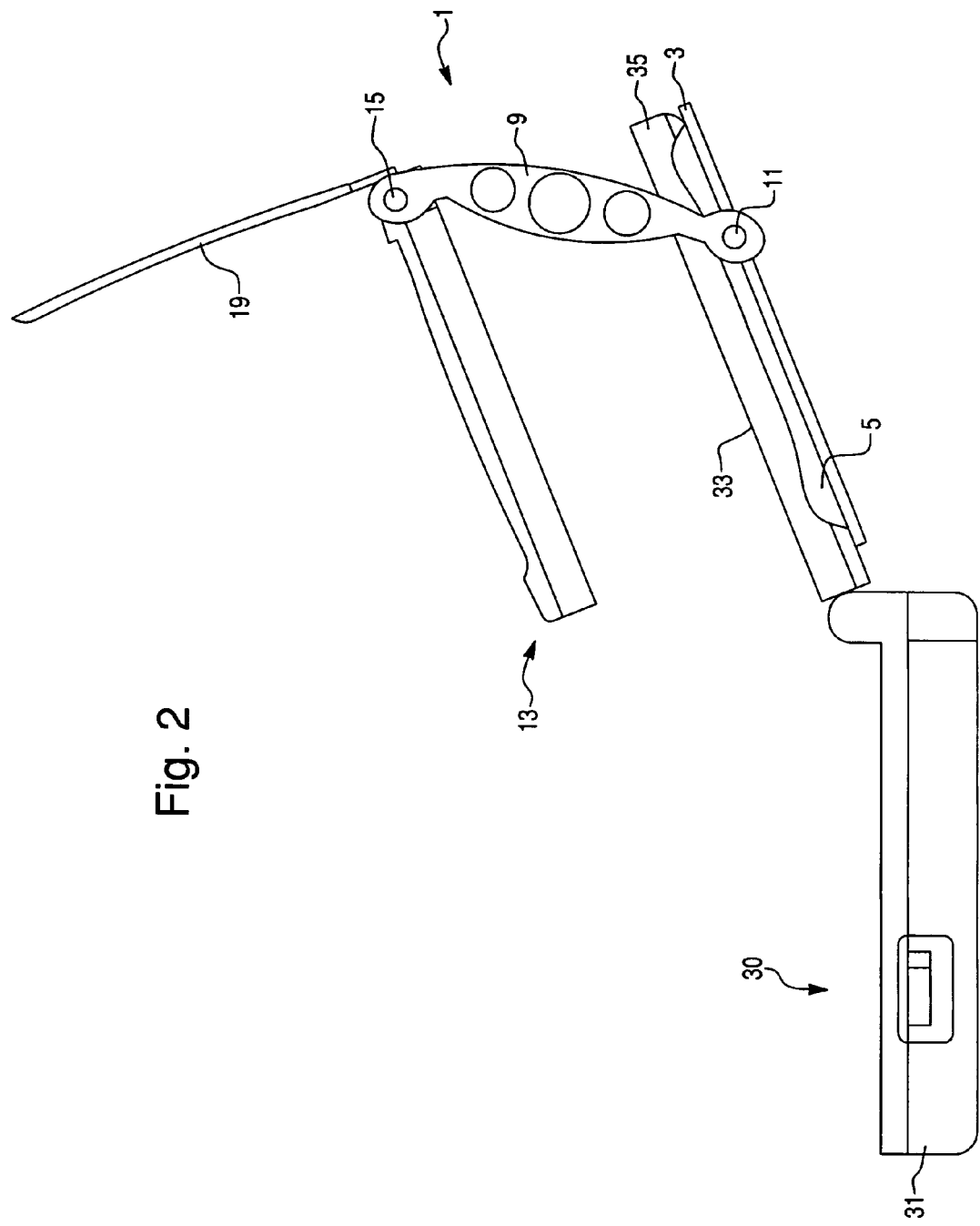
FIG. 2 is a side view of the magnifier of FIG. 1 secured to a display device in an open working position.

FIG. 2 depicts the magnifier device 1 secured to a portable video display device such as Nintendo's' Game Boy SP. The video display device 30 includes a main housing portion 31 and a flip up display 33 having a video display window (not shown). The flip up display 33 is rotatably secured to the main housing 1. The base member 3 of the magnifier 1 is secured to a backside of the flip up display 33. The side rails 5 engage opposing side surfaces 35 of the flip up display 33 in a snug fashion. Detents 7 engage corresponding recesses formed in the opposing side surfaces 35 to form a snap fit securement of the magnifier 1 to the flip up display device. As can be seen in FIG. 2, the magnifier portion 13 can be rotated and otherwise manipulated in a selective fashion to provide compound movement between the base member 3/flip up display 33 and the magnifier 13 and lens 17. Thus the viewer may adjust the magnifier accordingly to provide optimal viewing of the display window.

Figure 3:
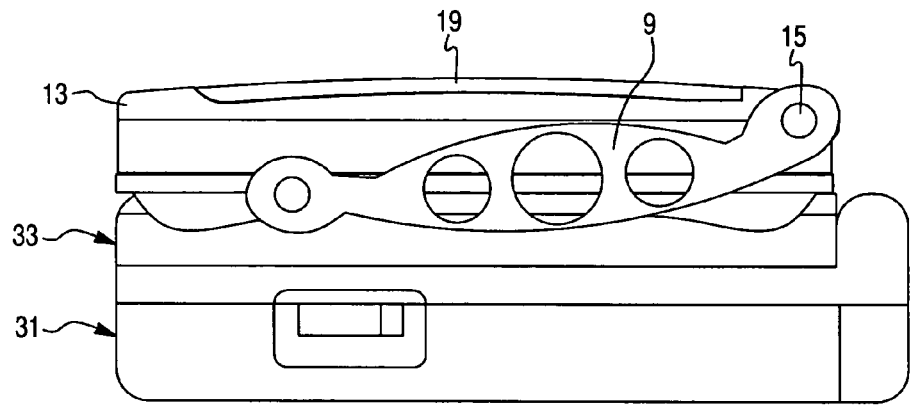
FIG. 3 is a side view of the magnifier of FIG. 1 secured to a display device in a closed stored position.
Figure 4:
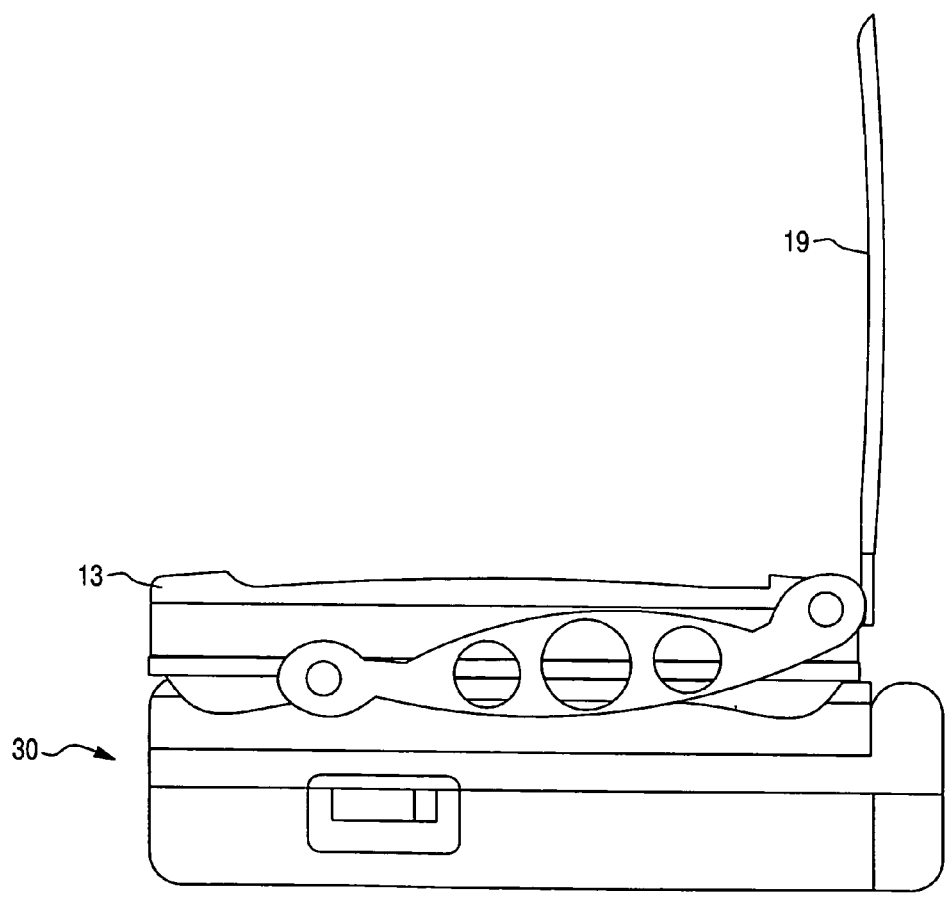
FIG. 4 is a side view of the magnifier of FIG. 3 with the cover open.

FIG. 3 depicts the arrangement of FIG. 2 in a folded compact stored position. The flip up display 33 is folded down onto the top of the main housing 31. The magnifier 13 may be simply rotated backwards to facilitate storage of the flip up display and then subsequently folded adjacent the back surface of the flip up display and base member 3. As can be seen between FIGS. 2–3, the magnifier portion 13 may be rotated between opposite sides of the flip up display device 33 and base member 5. In FIG. 3, the magnifier portion 13 is in a first stored position whereby the magnifier 13 is posited parallel to the flip up display 33 and located on a back surface side thereof adjacent and flush against the back surface of base member 3 of the magnifier 13. During use, the magnifier portion is rotated to a second position parallel to the flip up display 13 and base member 5 and located on an opposite front surface of the display 13 and base member 5 to facilitate magnification of the video display. Thus the magnifier display device articulates through a large range to provide storage on a single back side surface of the flip up display device 13 as well as a usable position located on the exposed front side of the display surface. The articulation of the magnifier portion 13 allows for flexible positioning of the magnifier for optimal viewing as well as a most compact storage position for a flip up display panel. FIG. 4 simply shows the magnifier 1 and video display device as shown in FIG. 3 with the cover rotated to an open position.

Figure 5:
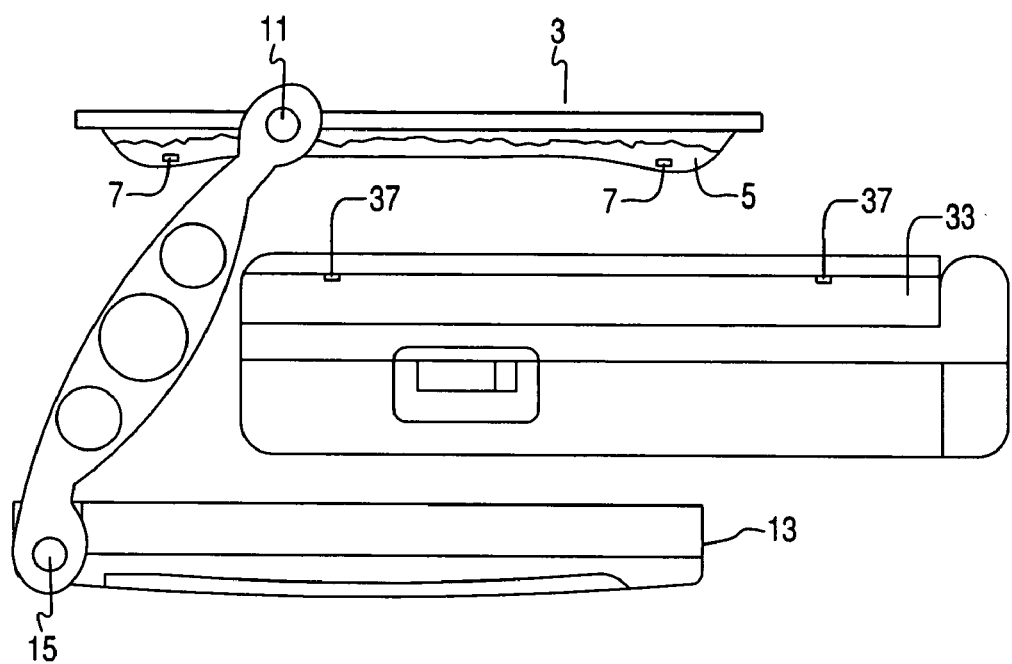
FIG. 5 is an exploded partially exposed side of the magnifier of FIG. 1 in an alternate orientation relative to the display device.

FIG. 5 shows an exploded partially exposed view of the magnifier and video display device revealing the connection therebetween. The detents 7 project inward from the far side rails 5 of the base member 3. A pair of recesses 37 are formed in the sidewall surfaces of each opposing sidewall 33. The base member 3 is simply snapped onto the back surface of the flip up display 31 and the detents 7 engage the corresponding recess 37 to provide a secure connection between the magnifier 1 and video display device 30. The magnifier portion 13 may be articulated either independently or in conjunction with the rotation of the flip up display 33 to facilitate easy positioning of the magnifier 13 between the compacted stored position if FIG. 3 and the usable position of FIG. 2. While not shown, the magnifier portion 13 is rotated through an orthogonal position relative to the base member 5 and flip up display 33.

Figure 6:
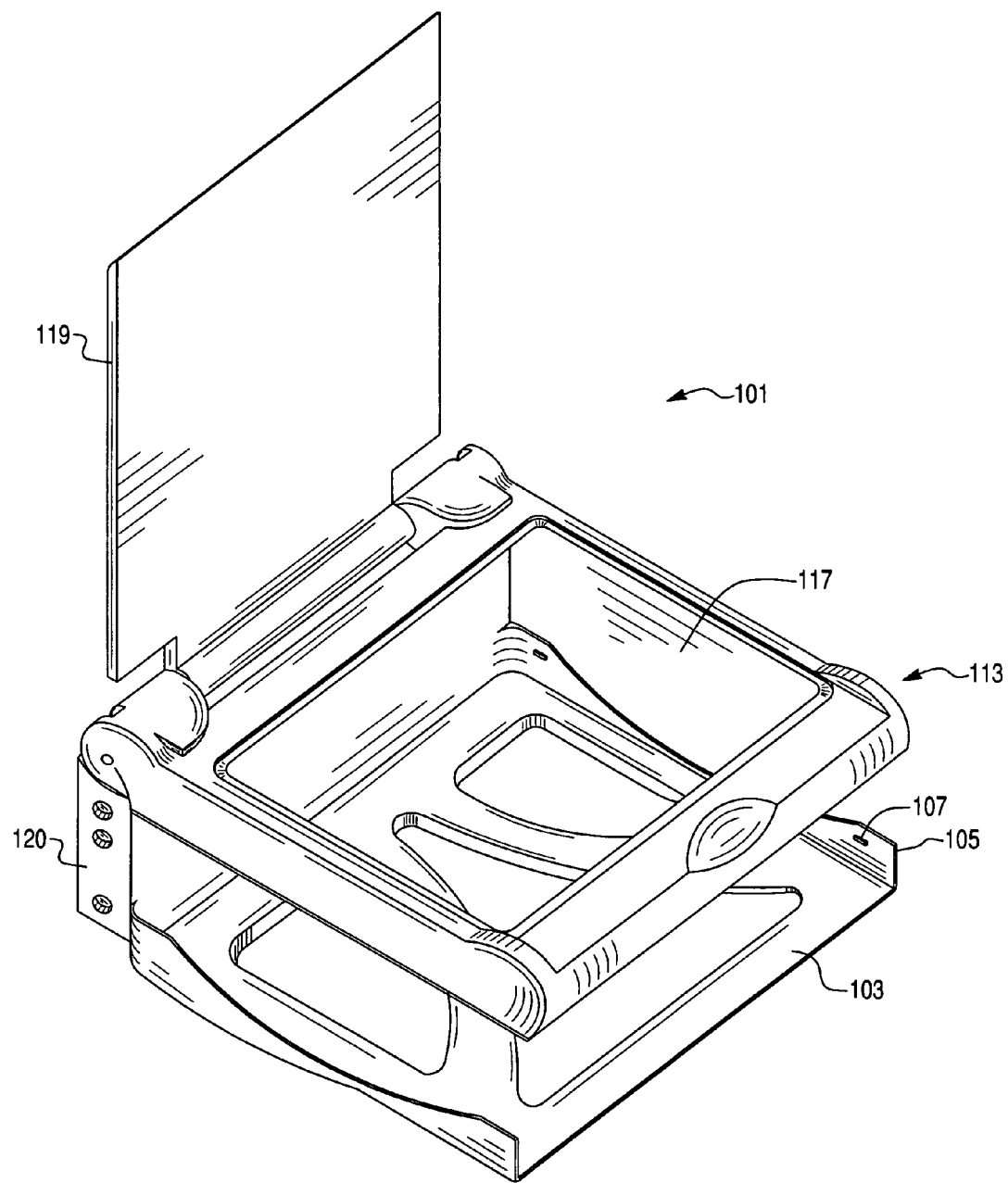
FIG. 6 is a perspective view of the magnifier device according to an alternate embodiment of the present invention.
Figure 11:
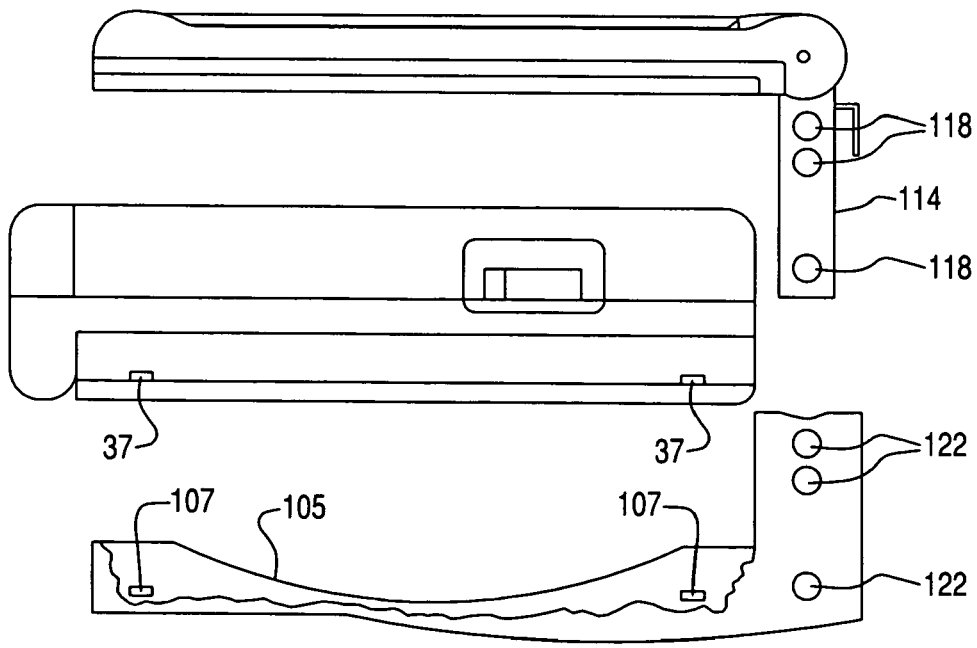
FIG. 11 is an exploded partially exposed side view of the magnifier of FIG. 8 in an alternate orientation relative to the display device.

FIG. 6 depicts a magnifier device according to an alternate embodiment of the present invention. The magnifier 101 includes a magnifier portion 133 having a magnifying lens 117. A base member 103 is formed much like the base member 5 of the previous embodiment including side rails 105 and detents 107 and connects to a video display device in a similar manner (as shown in FIG. 11) and will not be explained in further detail. An intermediate spacer member 120 forms a connection between the base member 103 and magnifier portion 113 and provides for vertical adjustment between the two members which will be describe below.

Figure 7:
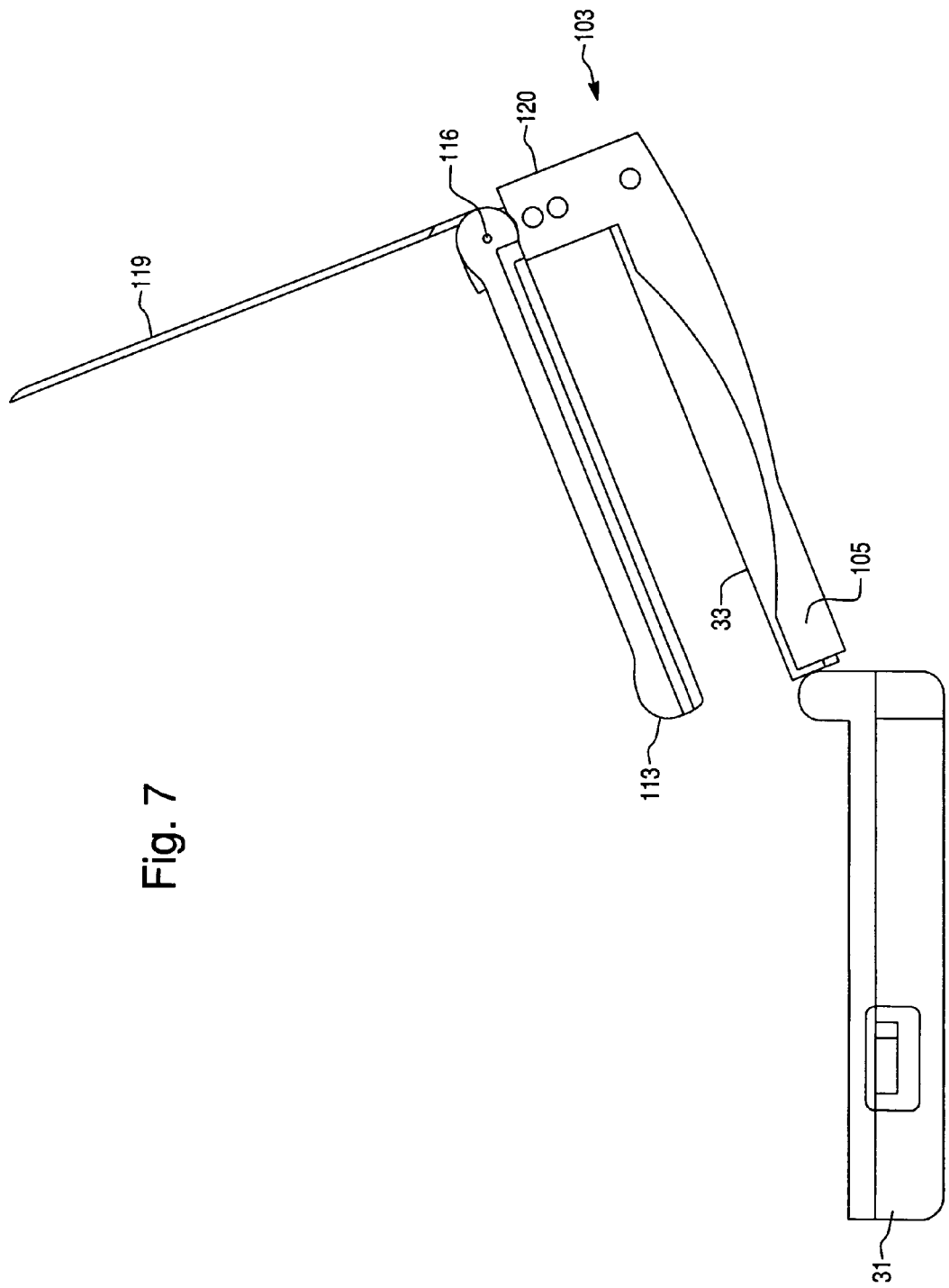
FIG. 7 is a side view of the magnifier of FIG. 6 secured to a display device in an open working position.
Figure 8:
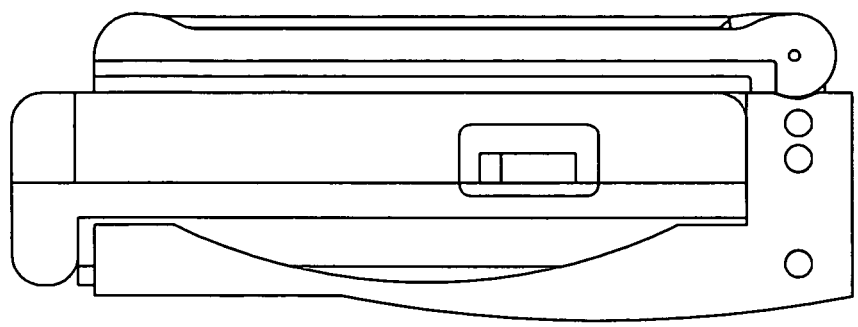
FIG. 8 is a side of the magnifier of FIG. 7 secured to a display device in a closed stored position.
Figure 9:
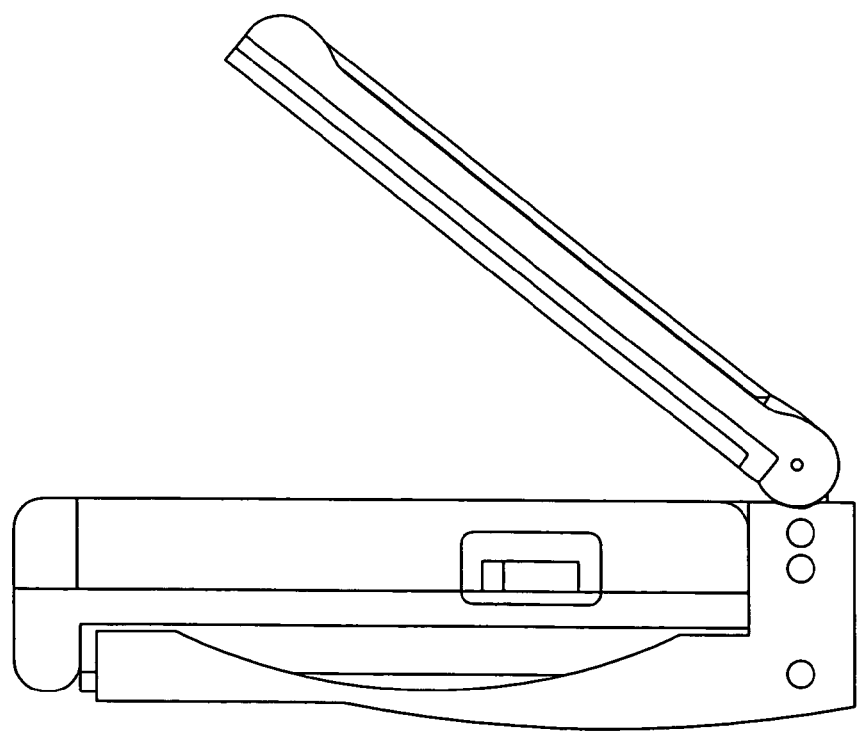
FIG. 9 is a side view of the magnifier of FIG. 7 in an alternate orientation.
Figure 10:
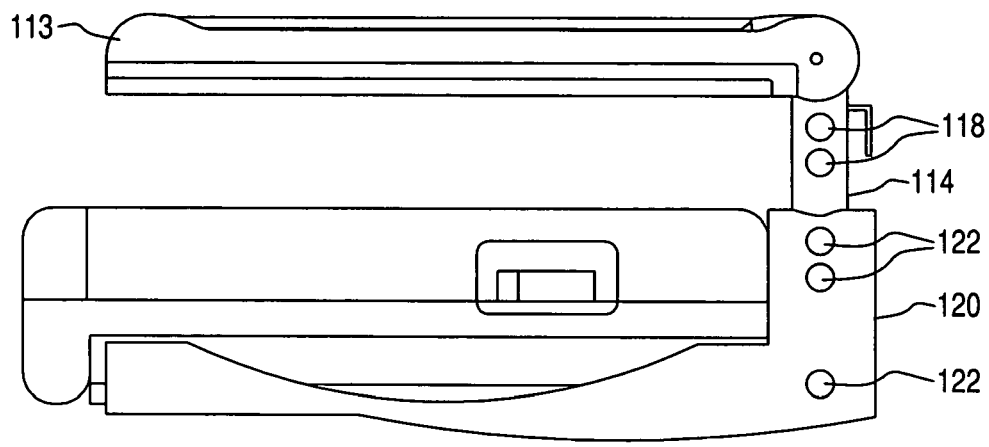
FIG. 10 is a side view of the magnifier of FIG. 8 in an adjusted position.

FIG. 7 depicts the magnifier of FIG. 6 secured to a video game device in an open working position. Similar to the previous embodiment depicted in FIG. 2, the magnifier portion 13 is positioned over the video window of the flip up display 33. The cover 119 may be swung between and open and closed position to selectively expose and cover the magnifying lens. To provide selective adjustment of the magnifier portion 113, the magnifier portion 113 is hinged at hinge 116 to a tab portion 114 (see FIGS. 10–11) to prove relative positioning of the magnifying portion 113. A vertical adjustment mechanism is provided to allow vertical adjustment of the magnifier relative to the flip up display 33. The tab portion 114 is slidably and removably disposed within an open recesses channel (not shown) formed in the intermediate spacer member 120. Stops are provided to provide selective positioning in predetermined vertical positions. A plurality of detents 118 or tabs extend outward from opposite sides of the tab 114 and selectively engage recesses 122 formed in opposing inner wall surfaces of the recesses channel of the intermediate spacer member 114. The magnifier portion 113 may simply be pushed/pulled to a desired vertical position until the detents 118 engage an appropriate recess 122. The recesses 122 may extend entirely through the side surfaces of the intermediate member 120. The combination of the pivotable motion of the magnifier portion relative to the tab 114 and the selective vertical positioning of the tab 114 relative to the intermediate spacer member 120, facilitates the ability to selectively position the magnifier lens 117 for optimal viewing as depicted in FIG. 7 as well as a compact storage position once the flip up display is folded to its stored position as depicted in FIG. 8.

The magnifier device of the present invention provides the ability to selectively position a magnifying lens proximate a video display window as well as to fold the magnifier device to a compact storage position while secured to the video display device. The present invention provides particular usefulness for video display devices having a flip up display.

While the foregoing invention has been shown and described with reference to a preferred embodiment, it will be understood by those possessing skill in the art that various changes and modifications may be made without departing from the spirit and scope of the invention.

What is claimed is:

1. A magnifier device in combination with a portable video display device:
   said video display device having;
   a main housing; and
   a flip up display member having a display window, said flip up display member being rotatably connected to said main housing between a first stored position wherein said flip up display is positioned substantially adjacent said main housing and a second position upright relative to said main housing to expose said display window to a user;
   said magnifier including;
   a base member; and
   a magnifier portion connected to and rotatable relative to said base member, wherein said magnifier portion is rotatable between a first position disposed adjacent said display window to magnify a display when said flip up display is in said second position and a stored position compactly arranged adjacent said video display device when said flip up display is in said first stored position; and
   a pair of spaced apart linking arms disposed between and pivotably connected to each of said base member and said magnifier thereby permitting compound movement between said base member and said magnifier,
   whereby said magnifier may be moved from a first stored position where the magnifier is located adjacent and flush against a back surface of said base member to a second open position raised above said base member at a spatial location opposite said back surface of said base member.

2. The combination according to claim 1, wherein said magnifier further includes a cover member rotatably connected thereto, said cover member being rotatably between a first position exposing said magnifier and said display window and a second position covering said magnifier.

3. The combination according to claim 1, wherein said magnifier further includes a cover member rotatably connected thereto, said cover member being rotatably between a first position exposing said magnifier and said display window and a second position covering said magnifier.

4. A combination magnifier device mounted to a portable video display device:
   said video display device having;
   a main housing; and
   a flip up display member having a display window, said flip up display member being rotatably connected to said main housing between a first stored position wherein said flip up display is positioned substantially adjacent said main housing and a second position upright relative to said main housing to expose said display window to a user;
   said magnifier including;
   a base member;
   a magnifier portion connected to and rotatable relative to said base member, wherein said magnifier portion is rotatable between a first position disposed adjacent said display window to magnify a display when said flip up display is in said second position and a stored position compactly arranged adjacent said video display device when said flip up display is in said first stored position;

an intermediate spacer member disposed between said magnifier portion and said base member to maintain said magnifier portion spaced apart from said base member, wherein said base member is directly connected to said flip up display member.

5. The combination according to claim 4, wherein said intermediate spacer member includes a vertical adjustment mechanism to allow selective vertical spatial positioning of said magnifier portion relative to said base member.

6. The combination according to claim 5, wherein said adjustment mechanism includes a tab formed on said magnifier portion and slidingly disposed within a recessed channel formed in said intermediate spacer member; and a plurality of stops to maintain said magnifier in one of a plurality of relative vertical positions relative to said intermediate and said base member.

7. The combination according to claim 6, wherein said stops include at least one detent formed in said tab engaging one of a plurality of recesses formed in an inner wall surface of said channel.

8. The combination according to claim 6, wherein said magnifier further includes a cover member rotatably connected thereto, said cover member being rotatably between a first position exposing said magnifier and said display window and a second position covering said magnifier.

9. The combination according to claim 1, wherein said base member of said magnifier includes opposed side rails snugly engaging opposing sides of said flip up display member.

10. The combination according to claim 9, wherein said side rails each include a detent engaging a recess formed in a corresponding one of said opposing sides of said flip up display to form a snap fit connection between said magnifier and said flip up display member.

11. The combination according to claim 1, wherein said base member of said magnifier includes opposed side rails snugly engaging opposing sides of said flip up display member and said side rails each include a detent engaging a recess formed in a corresponding one of said opposing sides of said flip up display to form a snap fit connection between said magnifier and said flip up display member.

12. The combination according to claim 6, wherein said base member of said magnifier includes opposed side rails snugly engaging opposing sides of said flip up display member and said side rails each include a detent engaging a recess formed in a corresponding one of said opposing sides of said flip up display to form a snap fit connection between said magnifier and said flip up display member.

13. A combination magnifier device and a portable video device, said portable video device having a main housing and a flip up display member, said magnifier comprising:

a substantially rectangular planar base member directly connected to said flip up display member remote from said main housing;

a magnifier portion connected to and rotatable relative to said base member, wherein said magnifier portion is rotatable between a first position parallel and co-planar with said base member to a second position substantially orthogonal to said base member;

an intermediate spacer member disposed between said base member and said magnifier portion, said intermediate spacer member including a vertical adjustment mechanism to allow selective vertical spatial positioning of said magnifier portion relative to said base member.

14. The magnifier according to claim 13, wherein said adjustment mechanism includes a tab formed on said magnifier portion and slidingly disposed within a recessed channel formed in said intermediate spacer member; and a plurality of stops to maintain said magnifier in one of a plurality of relative vertical positions relative to said intermediate and said base member.

15. The magnifier according to claim 13, wherein said base member of said magnifier includes opposed side rails to engage opposing sides of said portable video device, said side rails each include a detent to engage a recess formed in opposing sides of said portable video device to facilitate a snap fit connection therebetween.

16. A magnifier device for use with a portable video device, said magnifier comprising:

a substantially rectangular planar base member;

a substantially rectangular planar magnifier portion; and a pair of spaced apart linking arms each disposed between and rotatably connected to said base member and said magnifier portion thereby permitting compound movement between said base member and said magnifier so that said magnifier may be pivoted to a stored position whereby the magnifier is located flush against a back surface of the base member, wherein said magnifier portion is rotatable between a first position disposed on a first side of said base member and parallel thereto, to a second position substantially orthogonal to said base member and to a third position disposed on a second opposite side of said base member and parallel thereto, and wherein said base member of said magnifier includes opposed side rails to engage opposing sides of said portable video device, said side rails each include a detent to engage a recess formed in opposing sides of said portably video device to facilitate a snap fit connection therebetween, and wherein said magnifier further includes a cover member rotatably connected thereto, said cover member being rotatably between a first position exposing said magnifier to permit viewing therethrough by a user and a second position covering said magnifier.

* * * * *